United States Patent [19]

Haibeck

[11] 4,111,445

[45] Sep. 5, 1978

[54] DEVICE FOR SUPPORTING A PARAPLEGIC IN AN UPRIGHT POSITION

[76] Inventor: Kenneth Haibeck, 1413 E. Oak St., Sioux Falls, S. Dak. 57105

[21] Appl. No.: 805,135

[22] Filed: Jun. 9, 1977

[51] Int. Cl.[2] .......... B62D 53/06

[52] U.S. Cl. .......... 280/79.3; 297/5

[58] Field of Search .......... 280/47.34, 79.1 R, 79.1 A, 280/79.3, 79.2, 47.38; 135/67; 297/4, 5, 6, 423; 5/81 R; 188/33.99 R, 20

[56] References Cited

U.S. PATENT DOCUMENTS

| | | | |
|---|---|---|---|
| 503,105 | 8/1893 | Tingley | 280/79.3 |
| 2,859,837 | 11/1958 | Mize | 188/20 |
| 3,249,368 | 5/1966 | Ginzburg | 297/6 |
| 3,405,954 | 10/1968 | Wolfe | 297/5 |
| 3,993,349 | 11/1976 | Neufeld | 135/67 |

*Primary Examiner*—Robert R. Song

[57] ABSTRACT

A device for assisting paraplegics in standing and moving about. The device includes a platform mounted on casters so as to be movable and body restraining means adapted to engage the lower and upper back and the upper front of the body of the user. Contoured knee pads for support of the knees and a foot separator are provided to hold nonfunctioning legs of the paraplegic in position.

3 Claims, 1 Drawing Figure

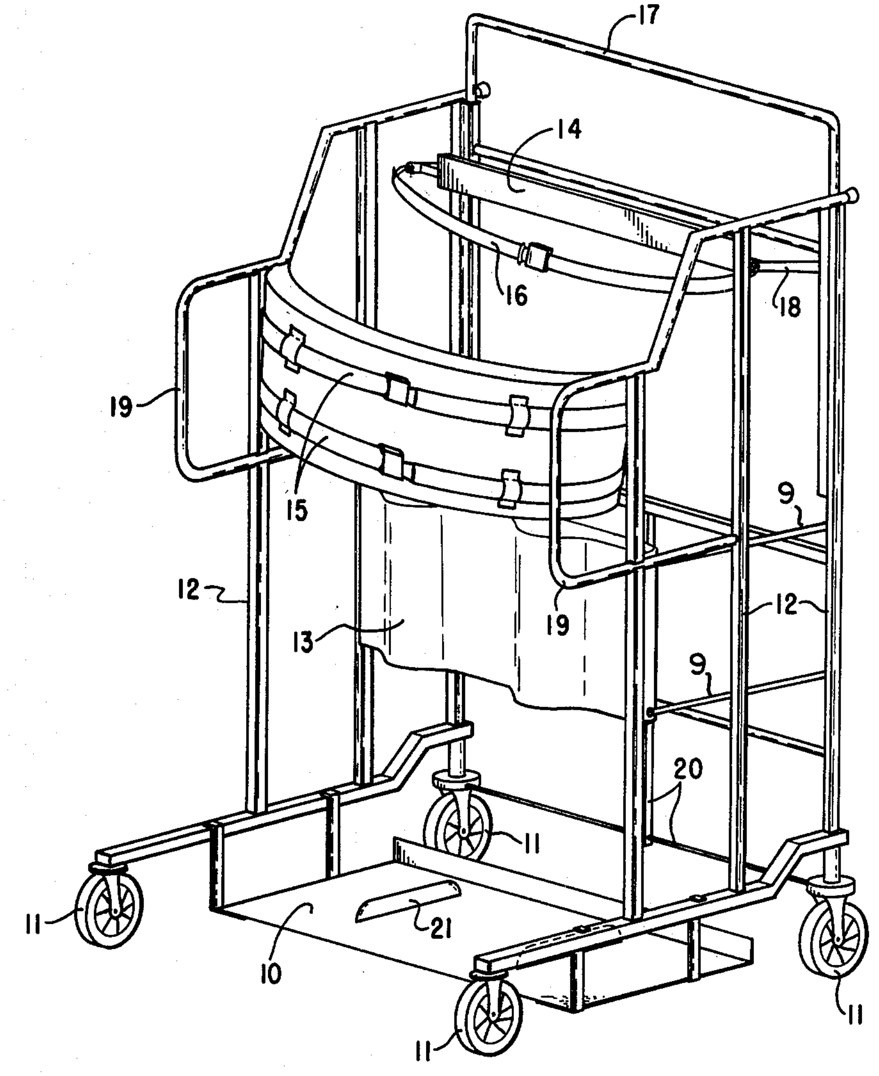
17
14
16
18
19
15
9
12
13
19
12
9
20
11
11
21
10
11
11

DEVICE FOR SUPPORTING A PARAPLEGIC IN AN UPRIGHT POSITION

BACKGROUND AND SUMMARY OF THE INVENTION

This invention pertains to a device adapted to support the body of a paraplegic in an upright position so that the person can be easily moved from place to place; and further, so that a change of position is possible.

Paraplegic patients who have lost the use of their legs because of muscular or nerve disorder or deterioration are frequently confined to a wheel chair or bed. However, it is often necessary — or at least desirable — to move such a patient from a sitting position in one place to a similar position in another — for example, from a wheel chair to an automobile seat and back again. Also, such a patient often tires of just sitting or lying down and may prefer to stand for awhile.

By the use of my device, I make possible the fulfillment of both goals with relative ease. I do this by means of a device having a platform on which the patient's feet may be set, and a framework above the platform adapted to engage the body of the patient at various points so that it will remain erect.

Previous devices have been built to assist a paraplegic to rise, but none has provided full support so that the patient can stand for as long as he may desire — even to the point of doing useful work in the standing position.

FIGURES

The FIGURE is a pictorial view of the device of my invention.

DESCRIPTION

Briefly my device comprises a platform mounted on casters upon which is erected a framework adapted to engage and support the body of the paraplegic patient at various points so that standing becomes possible in spite of the loss of control of the legs.

More specifically, and referring to the drawing, my device comprises a platform 10 mounted on castering wheels 11 so that it can be freely moved from one place to another. A framework 12 is built up from the front of the device for the support of the body of the paraplegic. The side parts of the frame will support the side of the body, though this is rarely necessary, and the rest of the frame carries various devices for the support of the rest of the body.

At the level of the knees, I provide a contoured pad 13 adapted to receive the knees of the patient and to hold them in a fixed position so that they do not move laterally. The pad 13 is supported from braces 9 which are fixed to upright members of the framework 12.

Also at the front part of the framework in the region of the chest I provide a cross member 14 against which the patient can rest his chest so that his body is upright. This member may be made adjustable so that the device may be used by patients of differing heights.

For the support of the body from behind, I provide strap members. The lower strap means 15 is preferably a broad belt fastened by means of one or more straps fastened to the members of the framework which may be adjustably buckled around the lower back or buttocks of the patient. An additional belt 16 may be provided at about the location of the chest cross member 14 for patients who may need the added support in that location.

Most paraplegic patients would like to be as independent as possible. Therefore, I provide a vertically adjustable grab bar 17 across the top of the framework. This bar is used by the patient to assist in pulling himself up. I further envision that a tray or shelf 18 could be affixed to the bar to hold tools, parts and the like for watch repair, small appliance, or radio repair so that the paraplegic may be engaged in a useful occupation while in a standing position. Hand grasp bars 19 may also be provided to be used by a nurse, orderly or other person to move the device whether occupied or unoccupied.

Further refinement is possible by use of a braked caster of any type now well known in the art. The lever system 20 is shown to illustrate a type of control which may be used with such casters. It may also be noted that the upright frame 12 is mounted only on the front of the device so that the members of the frame carrying the rear wheels can be kept low enough to be slid under a chair, bed or wheel chair so that the platform is in position to receive the feet of the patient. A divider 21 may be fixed on the platform to define the location of one foot relative to the other and to prevent one foot or leg from sliding laterally. Such sliding could easily cause the patient to collapse and fall, and is therefore quite undesirable.

In use, the device is wheeled up to a bed or chair on which the patient may be seated, so that the platform extends beneath the patient's feet. The feet are then positioned one on each side of the divider 21. The wheels or casters are set by the brake or blocked so that the device will not roll.

The patient can then grasp the crossbar 17 and pull himself up so that his knees engage the pad 13. Here also, each knee should be properly placed in its separate hollow in the contoured pad. Further pulling by the patient on the crossbar will result in a straightening of the knees and a lifting of the patient's body until it is erect. In this position the strap means 15 may be fastened behind the patient to support his body. It may be noted here that if the strap means is loosened slightly and is placed beneath the buttocks of the patient, so that the patient's body slouches just a little, the strap means may also serve as a sort of partial seat. Thus, a slight change of position is possible even within my device.

If necessary, the upper part of the body may also be supported by resting the patient's chest against the crossbar 14 and fastening the belt 16 behind the patient's upper back. This belt 16 may also be used to hold the tray 18 or worktable in place on the front of the framework.

After the patient is fastened into the device he can be wheeled to any desired location. Thus it is easy to move a patient from a bed to be seated on a toilet stool or wheel chair; or to move a patient from an automobile to any other device on which he might wish to be seated. In addition, by the use of all the restraining devices, it is possible for the patient to be held in a standing position with his hands and arms free for movement for as long as might be desirable.

I claim:

1. A device of the class described comprising platform means mounted for easy movement from one place to another, frame means erected from at least part of said platform, a pad mounted on said framework in position to engage the knees of a patient standing on said platform, strap means fastened to said framework and adapted to engage the back of said patient, a crossbar means on said frame means at a level above said strap means whereby the chest of the patient is supported, and grab bar means adjustably mounted at the front of said frame above said crossbar means whereby the patient by grasping and pulling on said grab bar means may assist in pulling himself erect.

2. The device of claim 1 in which said platform is mounted on wheels, said wheels being provided with brakes, and control means on said frame engaging said brakes whereby said brakes are actuated.

3. The device of claim 1 in which handles are formed on said framework so that they can be grasped for ready movement and handling of the device.

* * * * *